US006963648B2

(12) United States Patent
Wilder

(10) Patent No.: US 6,963,648 B2
(45) Date of Patent: Nov. 8, 2005

(54) ECHO/NOISE CANCELING DEVICE FOR USE WITH PERSONAL COMPUTERS

(75) Inventor: Kevin Dean Wilder, Dallas, TX (US)

(73) Assignee: Harold D. Wilder, Tyler, TX (US)

( * ) Notice: Subject to any disclaimer, the term of this patent is extended or adjusted under 35 U.S.C. 154(b) by 893 days.

(21) Appl. No.: 09/835,799

(22) Filed: Apr. 16, 2001

(65) Prior Publication Data

US 2001/0038697 A1 Nov. 8, 2001

Related U.S. Application Data

(60) Provisional application No. 60/197,555, filed on Apr. 17, 2000.

(51) Int. Cl.[7] .............................................. H03B 29/00
(52) U.S. Cl. ...................... 381/71.7; 381/66; 381/94.5; 370/286; 370/289; 379/406.01; 379/392.01
(58) Field of Search ........................ 381/71.7, 66, 94.5; 379/466.01, 392.01, 93.01; 370/286, 289

(56) References Cited

U.S. PATENT DOCUMENTS

| 5,657,384 A | 8/1997 | Staudacher et al. ......... 379/388 |
| 6,137,879 A * | 10/2000 | Papadopoulos et al. ..................... 379/387.01 |
| 6,237,025 B1 * | 5/2001 | Ludwig et al. ............. 709/204 |

* cited by examiner

Primary Examiner—Sinh Tran
Assistant Examiner—Justin Michalski
(74) Attorney, Agent, or Firm—C. W. Alworth

(57) ABSTRACT

An adapter for reducing echo and noise in internet telephony for use with personal computers. The device employs analog circuitry to provide signal filters and delay which act together to reduce line induced echo and background noise, thus providing a clear voice communication channel. The device is readily inserted between standard microphones and speakers employed in the personal computer.

11 Claims, 14 Drawing Sheets

ECHO/NOISE CANCELING DEVICE FOR USE WITH PERSONAL COMPUTERS

This application claims priority from Provisional Patent Application Ser. No. 60/197,555 filed on Apr. 17, 2000.

This device relates to the computer industry and specifically to a device to reduce or cancel echo and noise found within internet telephony.

BACKGROUND OF THE INVENTION

The speakerphone device has been in use for years on traditional telephone lines around the world. This type of device generally is an instrument utilizing a switching technology that allows one or the other party to speak at once, but not simultaneously. There are more advanced devices that integrate DSP's (Digital Signal Processors) to accomplish a Full-Duplex (simultaneous conversation), but they are very expensive by comparison. See for example U.S. Pat. No. 5,657,384, Staudacher et al., which discloses a Full Duplex Speakerphone using DSP technology.

The invention presented in this disclosure is an inexpensive Full-Duplex solution for the new and exciting Internet using standard analog techniques. Numerous companies are offering free long-distance phone calls over the Internet, but users are mostly restricted to using headphones, due to echo. DSP technology is prohibitive, due to the long delay before the echo occurs. This long delay would require a rather large amount of memory and CPU overhead resulting in too expensive of a device for the consumer market.

The invention presented in this disclosure accomplishes a Full-Duplex conversation, without echo, over the Internet at a very inexpensive price. The invention makes an Internet conversion duplicate the natural sound of a face-to-face conversion.

SUMMARY OF THE INVENTION

There is described in the present disclosure a speakerphone adapter for suppressing general household background noise, i.e. air conditioners, radios and televisions. This device also significantly reduces echo and regenerative feedback associated with microphone and speaker devices. The device also increases the effective digital communications bandwidth over the Internet by improving on the silence detection compression algorithms through the use of hardware. The invention is positioned between the microphone and speakers and the personal computer. The device in the present disclosure is comprised of a microphone pre-filter, amplifier, band-pass filter, a microphone attenuator and a post filter; a mute control amplifier, mute control filter, an absolute value circuit, a successive peak integrator, a R/C control circuit and a mute control comparator. The device also is comprised of a Right channel attenuator, Left channel attenuator, a receive signal combiner, signal filter amplifier, an absolute value circuit and a successive peak integrator amplifier.

The pre-filter, microphone amplifier and band-pass filter provide the correct shape and amplitude of the transmitted audio signal. The shape can be represented by a filter response having a center frequency of 638 hertz with −3 dB cutoff points at 281 hertz and 1.5 kilohertz. The microphone attenuator provides up to 9.8 dB of signal attenuation. The post-filter smoothes the overall audio signal after attenuation and muting occurs. The device also consists of a mute control amplifier and filter providing gain and reduction of unwanted signals. The filter response can be represented with a pass-band center frequency of 1.17 kilohertz and −3 dB points at 447.9 hertz and 2.9 kilohertz. The filtered signal is then amplified and integrated over time driving a R/C timing circuit. Finally the R/C timing circuit is the signal source for the mute control comparator, which is used for improving the digital signal bandwidth.

The Left and Right channel attenuators, receive signal combiner, the signal filter amplifier, absolute value circuit and integrator amplifier form the receive side of the device. The channel attenuators provide up to 9.8 dB of attenuation individually. The receive signal combiner is utilized for combining the Left and Right channels to feed the signal filter and amplifier. The filter portion can be represented by a filter response having a high-pass frequency of 1.0 kilohertz with a −3 dB cutoff at 175 hertz. The gain of the amplifier is approximately 20 dB. The amplified and filtered signal is then feed into the ABS (absolute value circuit). The varying DC signal developed in the ABS circuit is then amplified and successively integrated over time providing the microphone attenuator control signal.

DESCRIPTION OF THE INVENTION

Figure 1:
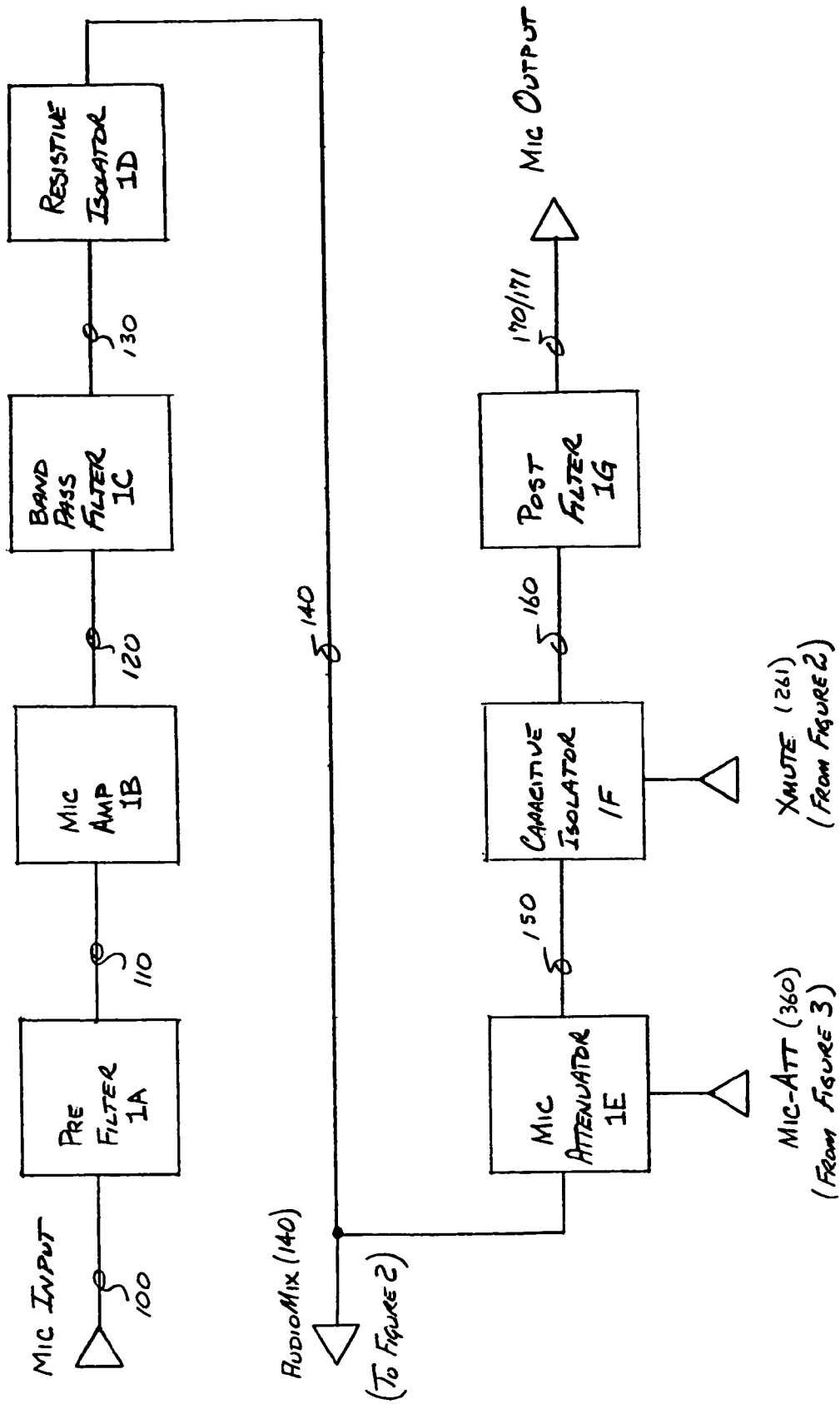
FIG. 1 shows a block diagram of the transmit section of the instant device.
Figure 4:
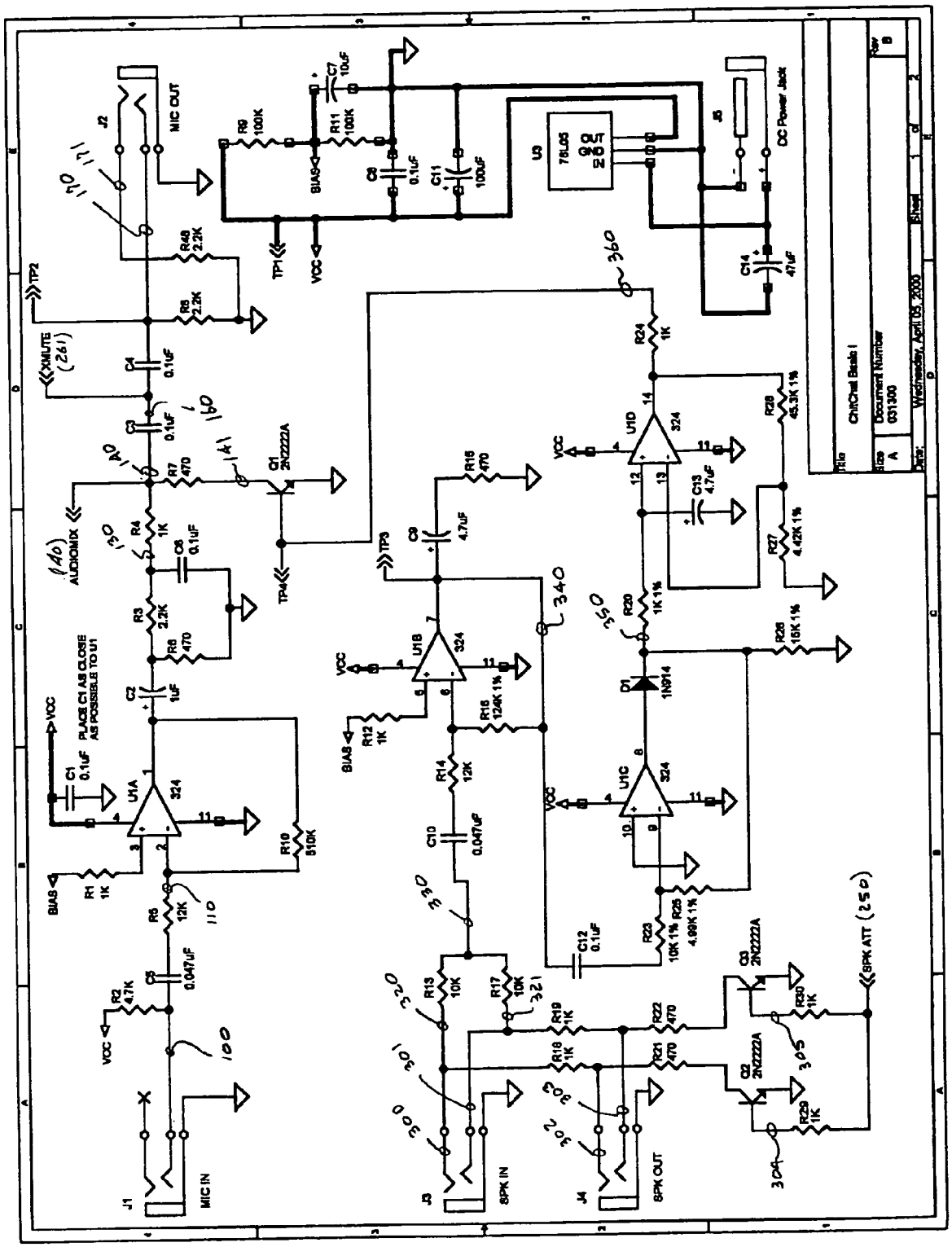
FIG. 4 is page one of the general device schematic diagram.
Figure 6:
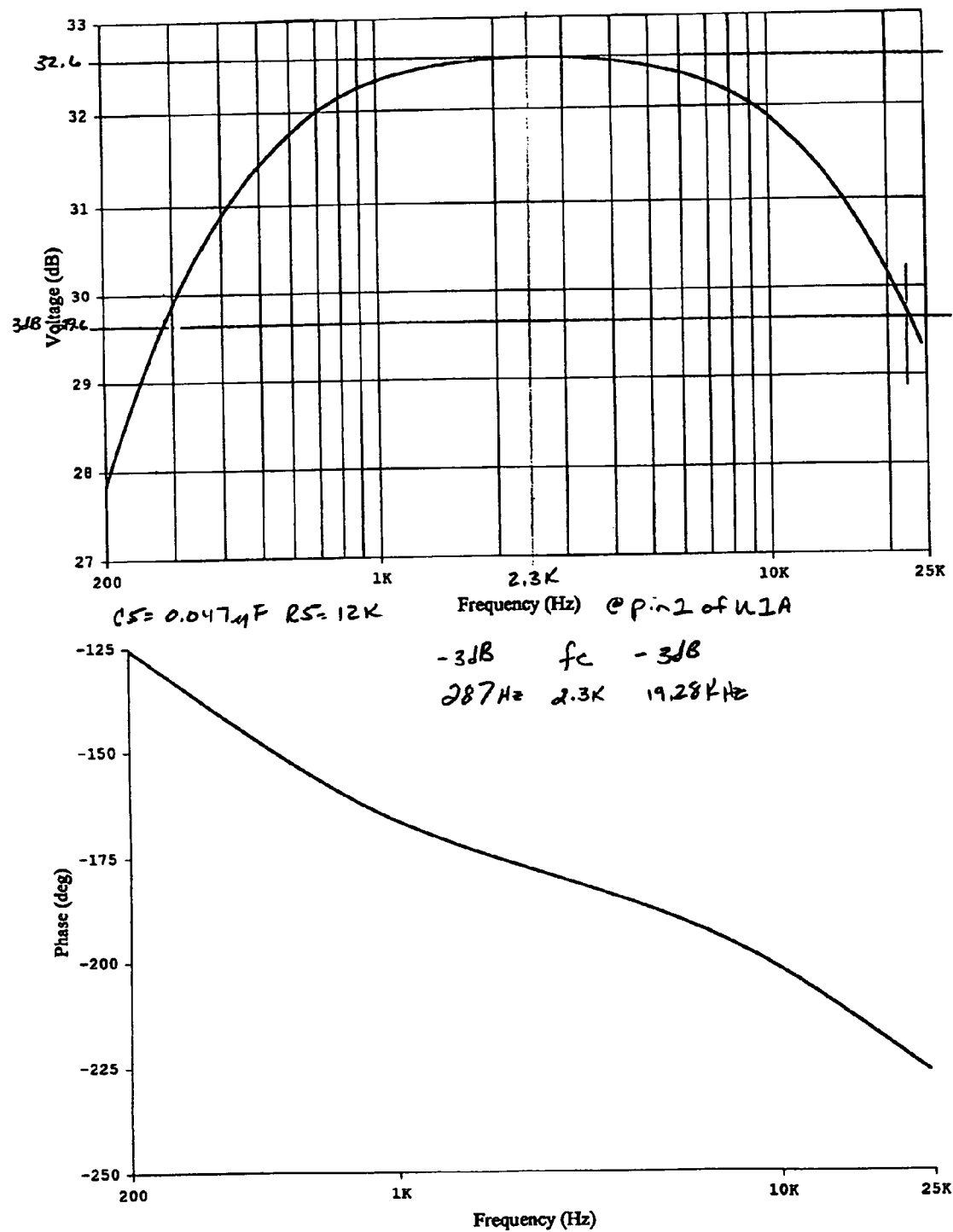
FIG. 6 shows the microphone pre-filter response curve.

FIG. 1 is a block diagram illustrating the Transmit Section of the device. Beginning with the Microphone Input Port the microphone signal 100 is applied to Pre-Filter, 1A. (The microphone input jack is shown in FIG. 4, and only one channel is used. It should be noted that both left and right channels may be combined through a proper resistive network.) The Pre-Filter, 1A, has a band-pass filter response with the preferred center frequency of 2.3 kilohertz with −3 dB points at 287 hertz and 19.28 kilohertz, although the values may vary by plus/minus 20 percent. The filter response curve can be seen in FIG. 6. The signal then continues on path 110 to Microphone Amplifier, 1B.

Figure 7:
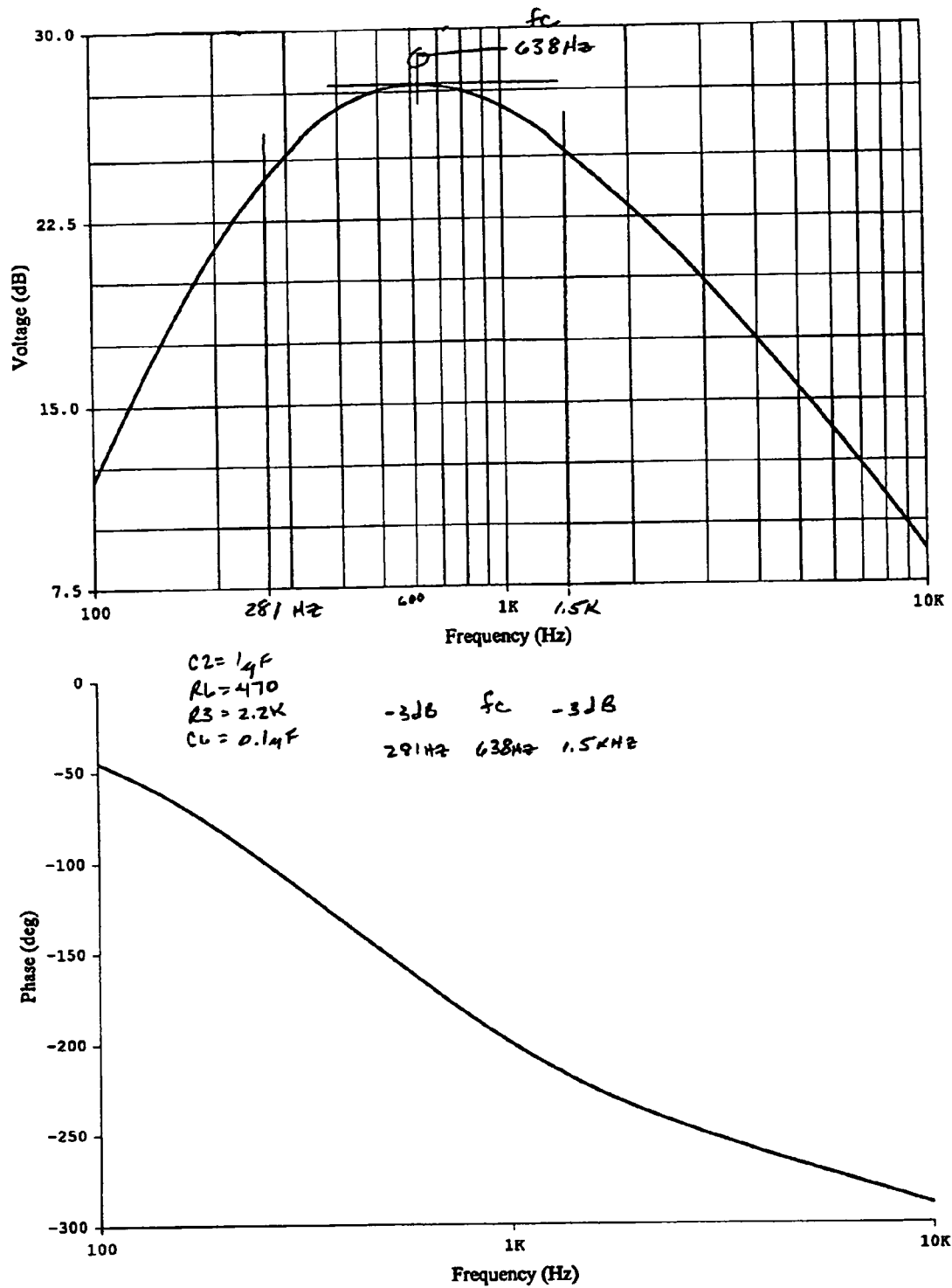
FIG. 7 shows the second order band-pass filter response curve.

The Microphone Amplifier, 1B, has an AC signal gain of approximately 32.6 dB producing signal 120. The output signal, 120, enters a Second Order Band-pass Filter, 1C, having a preferred center frequency of 638 hertz with −3 dB cutoff points at 281 hertz and 1.5 kilohertz, although the values may vary by plus/minus 20 percent. The filter response curve can be seen in FIG. 7.

The filtered signal, 130, continues onto the Resistive Isolator, 1D, which is a simple resistor designed to isolate signal 130 and signal 140 from the Microphone Attenuator circuit, 1E. Signal 140 also provides the AUDIO-MIX signal that serves as the input signal to the Microphone Mute Control Circuit shown in FIG. 2.

The Microphone Attenuator circuit, 1E, provides a maximum attenuation of approximately 9.8 dB. The attenuator circuit employs a bipolar transistor, Q1, which is connected by its base to the microphone attenuator control signal, MIC-ATT, shown as signal 360. Signal 360 is one of the outputs of the Receive Circuit that will be described later in the description of FIG. 3. Essentially, signal 360 controls the Collector-Emitter resistance of Q1, which in turn operates with resistors R4 and R7, as a voltage divider, producing attenuated signal 140 (see FIG. 4), which passes through the Capacitive Isolator circuit, 1F, to the Post-Filter circuit, 1G.

The capacitive isolator circuit is a simple capacitor, C3, which serves to isolate signal 140 from signal 160. Signal 160 can effectively be shunted to ground by the microphone mute control signal, XMUTE, (signal 261) which is one of the outputs of the Microphone Mute Control circuit shown in FIG. 2.

Figure 8:
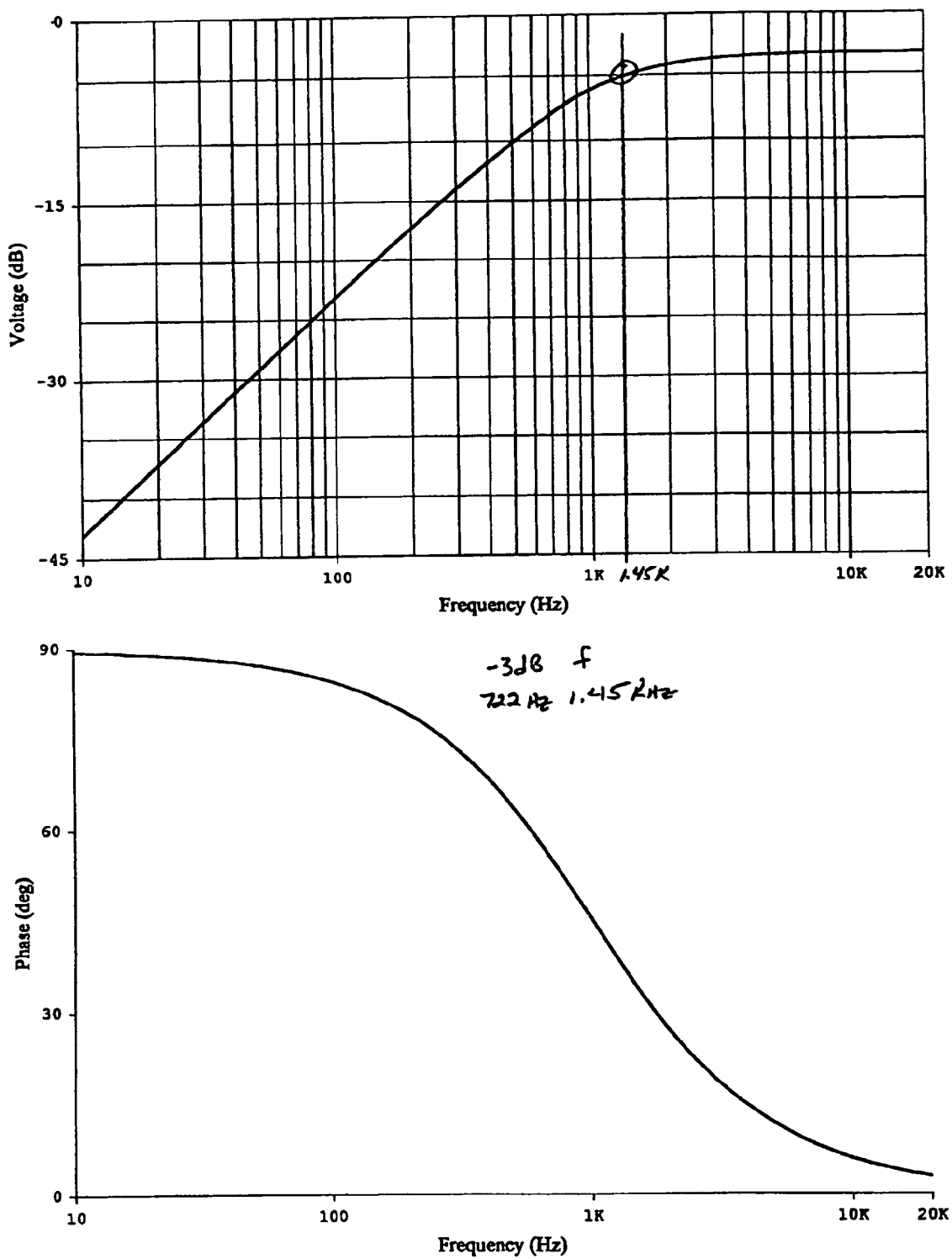
FIG. 8 shows the post filter response curve.
Figure 9:
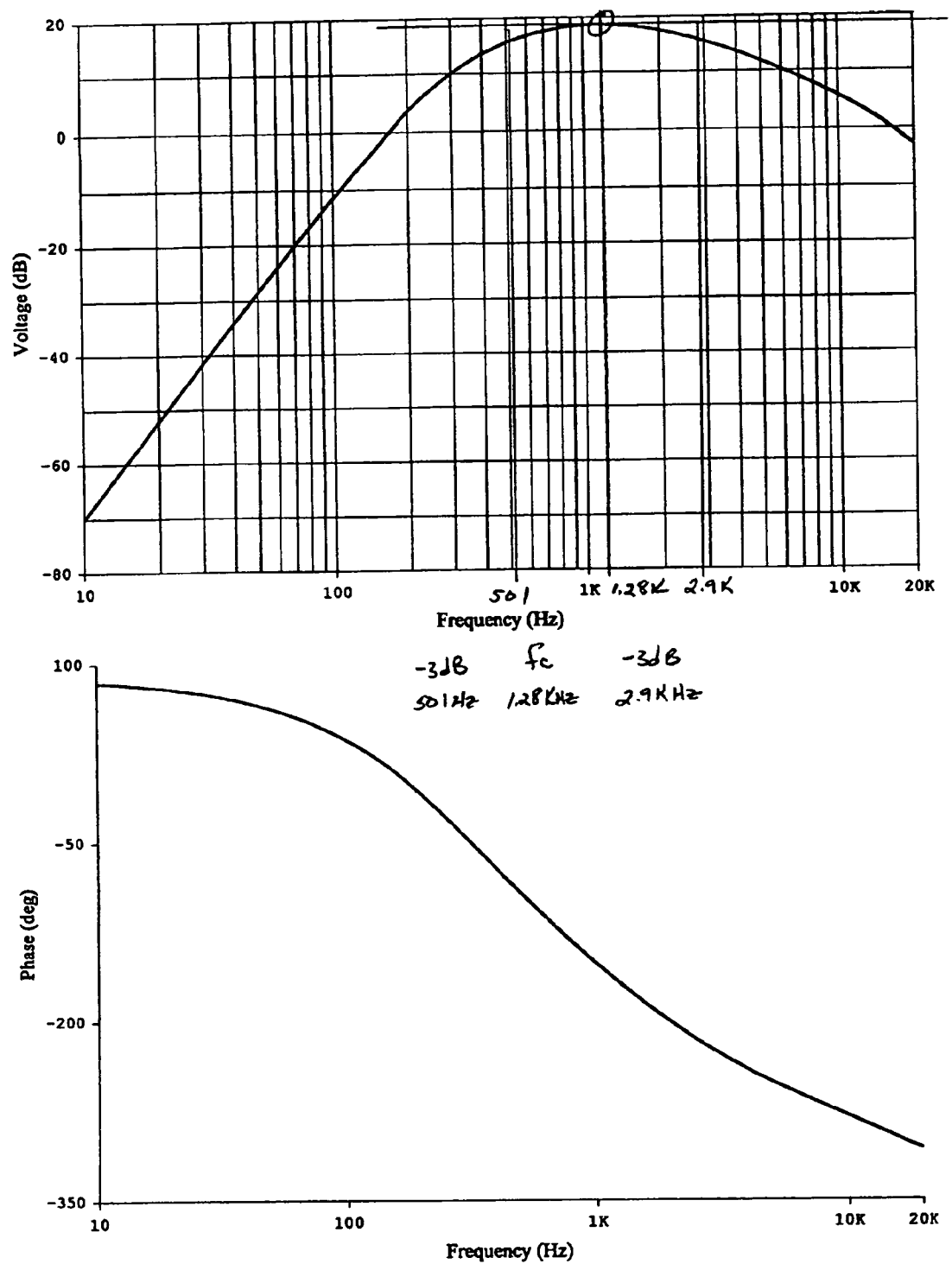
FIG. 9 shows the overall microphone circuit response curve.

The Post-Filter, 1G, is a high-pass filter having a preferred frequency response of 1.45 kilohertz and greater pass-band with a −3 dB cutoff point at 722 hertz, although the values may vary by plus/minus 20 percent. The filter response curve can be seen in FIG. 8. Following the high-pass filter is the Microphone Output Port. (Both channels of the output jack may be connected together as shown in FIG. 4.) The overall frequency characteristics of the combined filter response's within the Microphone Attenuator circuit can be seen in FIG. 9.

Figure 2:
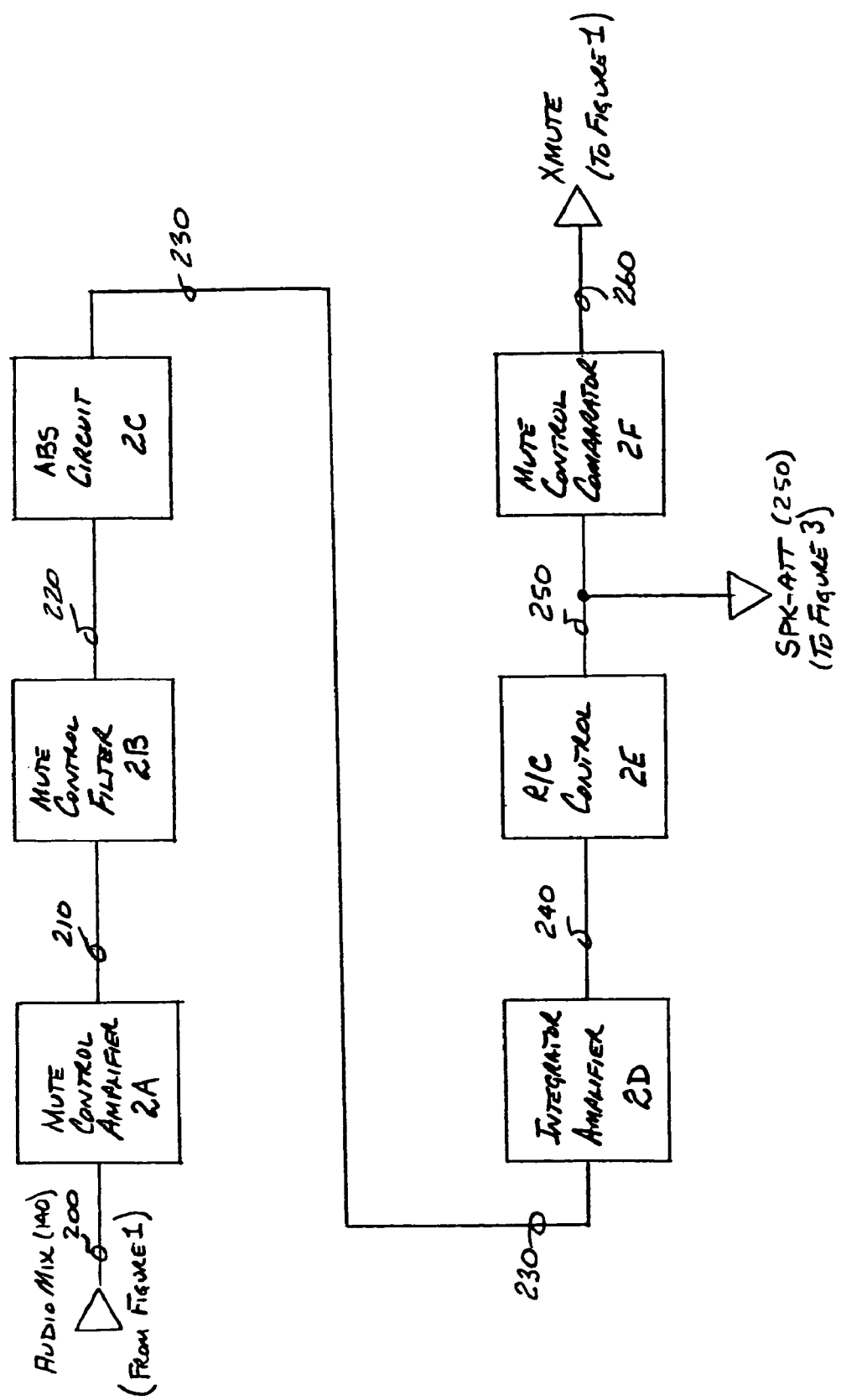
FIG. 2 shows a block diagram of the microphone mute section of the instant device.
Figure 10:
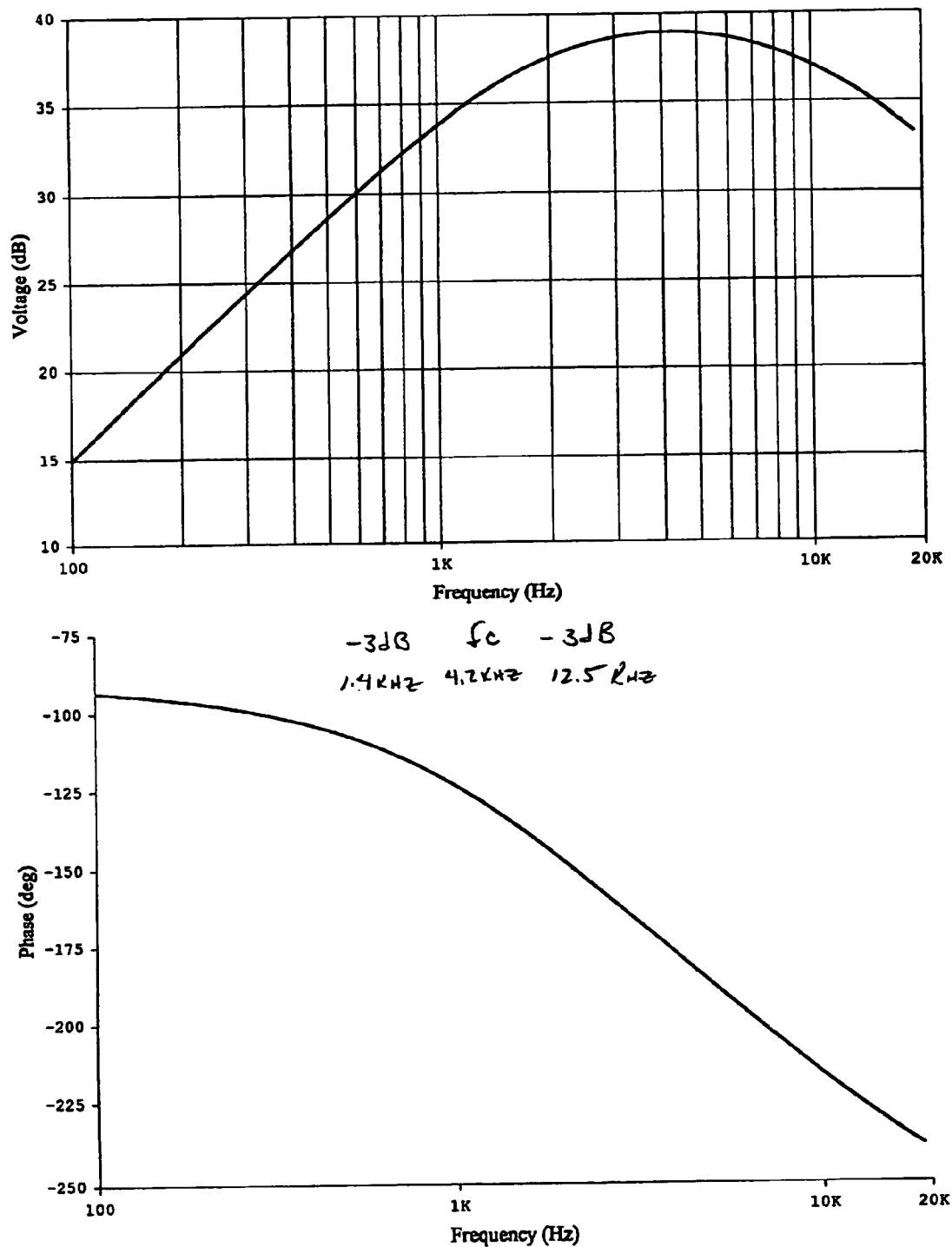
FIG. 10 shows the mute control amplifier second order band-pass filter response curve.

FIG. 2 is an illustrated block diagram of the Microphone Mute Control Section. The input signal is derived from the resistive isolator of FIG. 1 as the AUDIO-MIX signal, signal 140 (FIG. 1) that is also signal 200 (FIG. 2), and is applied to the Mute Control Amplifier, 2A. The Mute Control Amplifier, 2A, exhibits an AC signal gain of approximately 39 dB. The amplifier also has a band-pass filter response having a preferred center frequency of approximately 4.2 kilohertz with −3 dB cutoff points at 1.4 kilohertz and 12.5 kilohertz, although the values may vary by plus/minus 20 percent, that produces signal 210. The filter response curve can be seen in FIG. 10. Signal 210 is applied to the Mute Control Filter, 2B.

Figure 11:
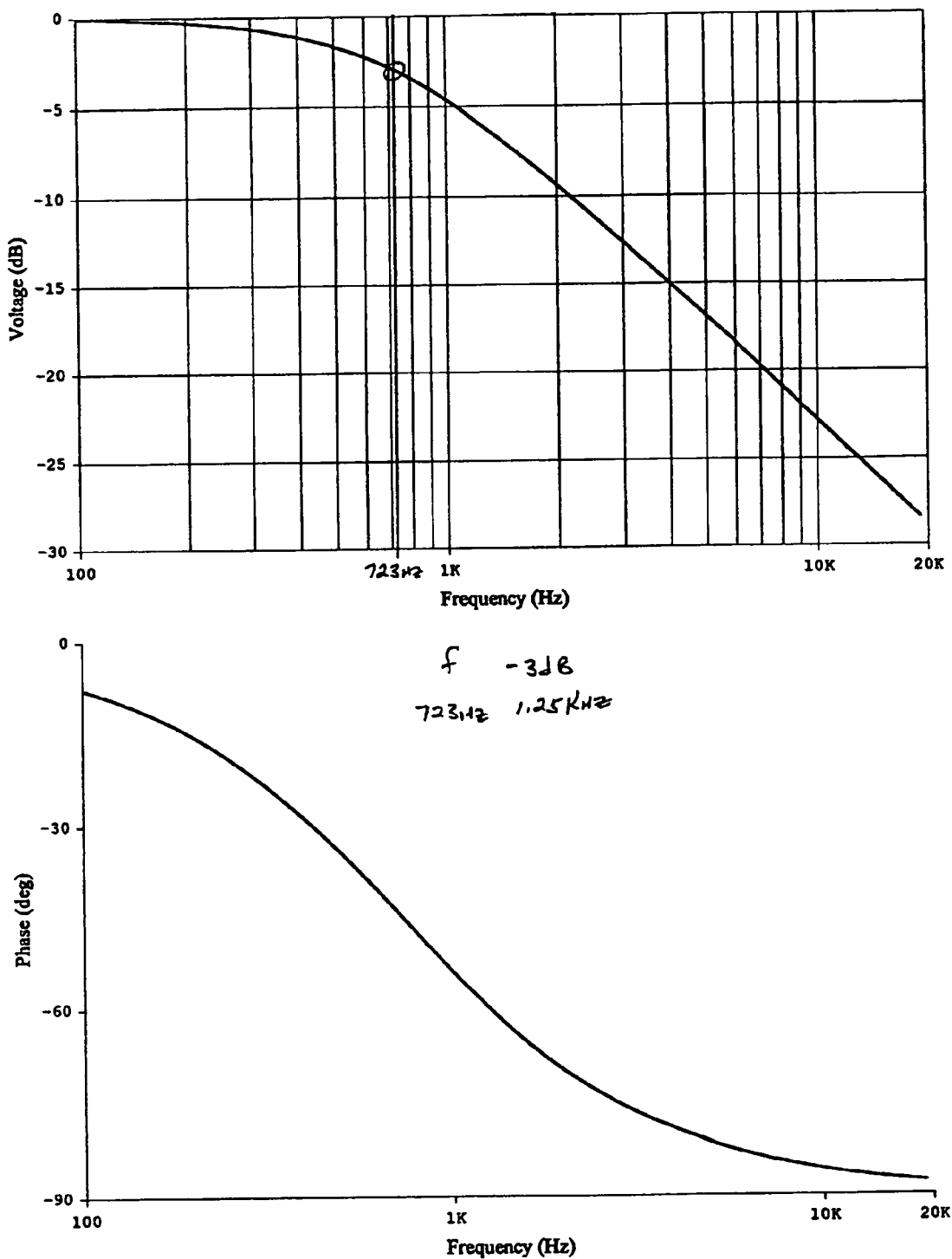
FIG. 11 shows the mute control filter response curve.
Figure 12:
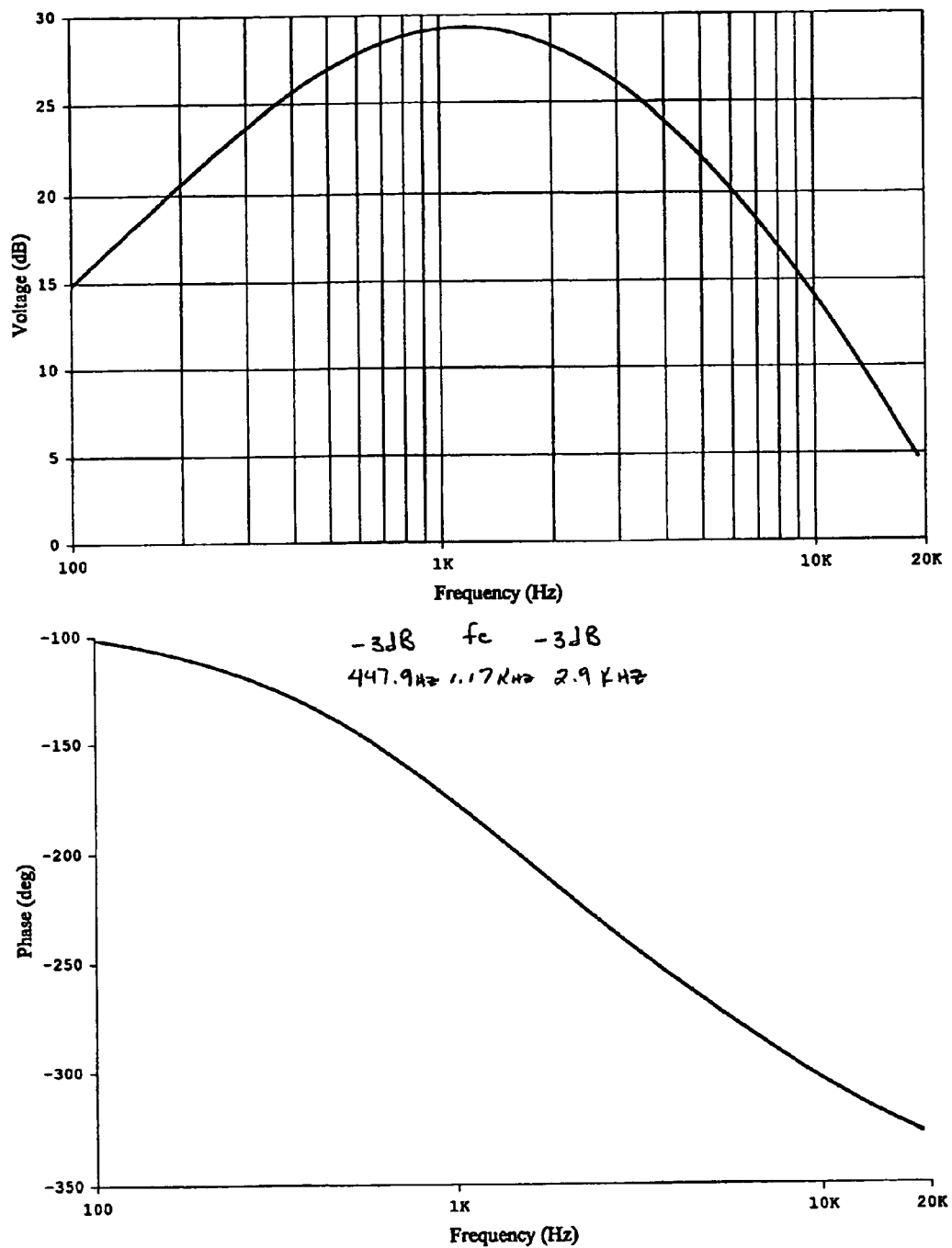
FIG. 12 shows the overall mute control response curve.

The Mute Control Filter, 2B, is a Second Order Low-Pass Filter having a preferred frequency of 723 hertz with a −3 dB cutoff point at 1.25 kilohertz, although the values may vary by plus/minus 20 percent. The slope of the filter can be seen in FIG. 11. More important is the combined overall frequency response of the Mute Control Amplifier, 2A, and the Mute Control Filter, 2B. The preferred combined band-pass filter response, signal 220, has a center frequency of 1.17 kilohertz with −3 dB cutoff points at 447.9 hertz and 2.9 kilohertz, although the values may vary by plus/minus 20 percent. The preferred filter response curve can be seen in FIG. 12.

The band-pass filtered signal 220 passes onto the ABS (Absolute Value) circuit, 2C. The ABS circuit, 2C, can be recognized as a ladder-type single stage absolute-value circuit as described by H. A. Wittlinger in the RCA CA3140 data sheet ("Applications"). The gain of the ABS circuit is 0.5, thus a 2 Volt peak-to-peak signal would produce an absolute value of 1 Volt. The rectified DC signal 230 enters an Integrator Amplifier circuit, 2D.

The Integrator Amplifier, 2D, has an RC charge time constant of approximately 29 milliseconds and a RC discharge time constant of approximately 941 milliseconds, although the values may vary by plus/minus 20 percent. The amplifier portion of the Integrator Amplifier, 2D, has a DC signal gain of approximately 21 dB, although the value may vary by plus/minus 20 percent. The varying DC signal 240 produced continues onto R/C Control Circuit, 2E.

The R/C Control circuit, 2E, is used to extend the discharge time of Integrator Amplifier, 2D, and smooth the decay curve. A typical decay curve time would be 6.5 seconds and an example of the decay curve can be seen in FIG. 13. The output of the R/C Control circuit, signal 250, forms the speaker attenuator control signal, SPK-ATT, and also drives the Mute Control Circuit, 2F. The SPK-ATT signal controls the output of the speakers and essentially attenuates the speakers whenever audio is present at the microphone.

Figure 13:
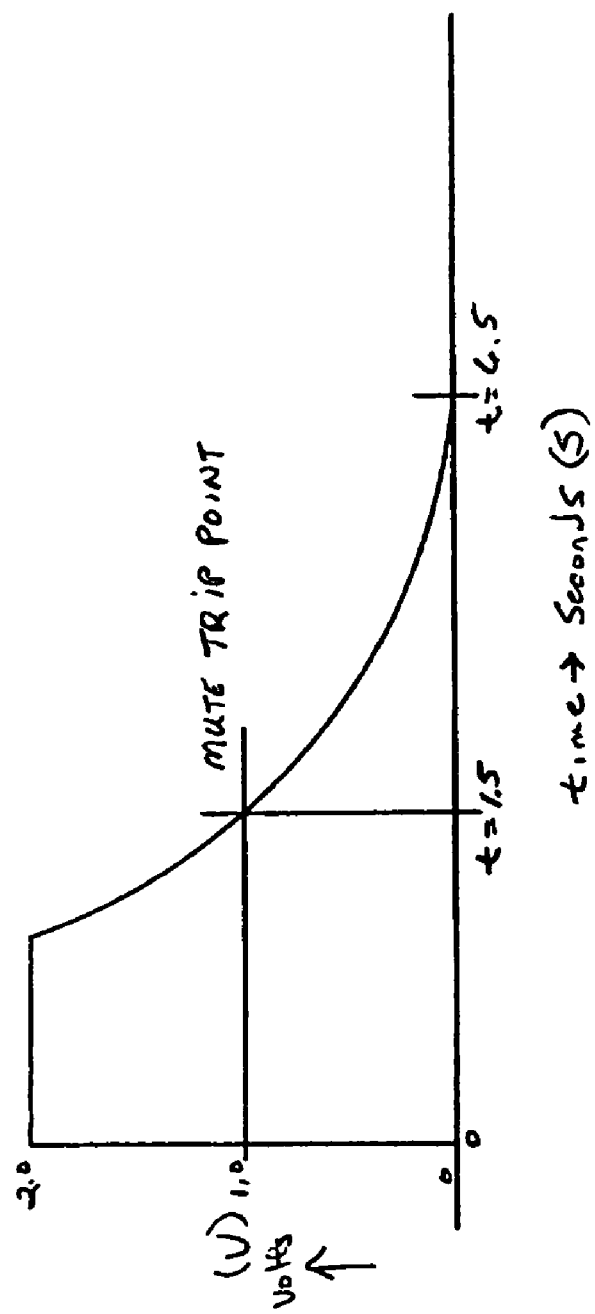
FIG. 13 shows the R/C Control Decay Curve.

The Mute Control circuit, 2F, is a voltage comparator with a trip voltage point of approximately 1.0 volt. Once the trip point is exceeded the comparator enables the microphone mute control signal, XMUTE (signal 261). XMUTE (as explained above) allows or disallows the microphone audio signal developed in the Microphone Attenuator circuit, 1E, signal 160, to pass onto the Microphone Output (signals 170–171). The time and voltage relationship of the comparator is shown in FIG. 13 as the "Mute Trip Point" that occurs when the voltage reaches 1.0 VDC at 1.5 seconds in time.

The XMUTE signal suppresses all transmitted audio from the device to the PC. This is because some software used within personal computers for CHAT and IP Telephony directly convert any audio signal. I.e., small amounts of audio received at the Microphone Input Port that are useless for all intents and purposes will be heard or "seen" by the software. The problem is that, once the CODEC begins converting useless sound into useless data, the useless data starts utilizing bandwidth thus degrading the quality of the conversation given finite bandwidth restrictions.

Figure 3:
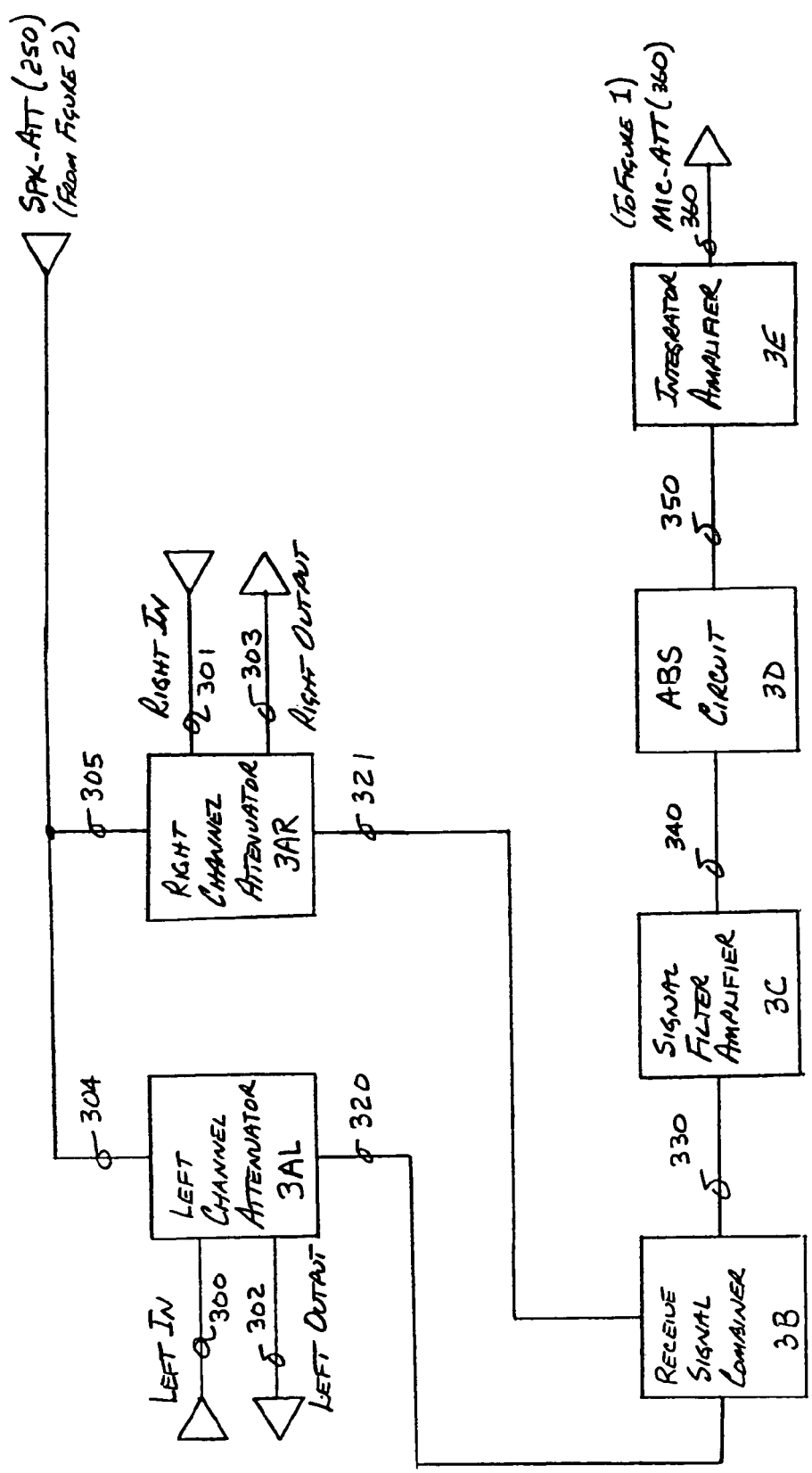
FIG. 3 shows a block diagram of the receive section of the instant device.

FIG. 3 is an illustrated block diagram of the Receive Section of the device. Beginning with the Left Channel In Port the audio signal, 300, enters the Left Channel Attenuator, 3AL. The attenuated signal, 302, exits Left Channel Attenuator via the Left Channel Output Port. Now examining the Right Channel In Port the audio signal, 301, enters the Right Channel Attenuator, 3AR. The attenuated signal, 303, exits Right Channel Attenuator via the Right Channel Output Port. The attenuation of both channels is controlled by the SPK-ATT signal, 250, provided by the Microphone Mute Control Section described above. The SPK-ATT signal controls the output of the speakers and essentially attenuates the speakers whenever audio is present at the microphone (the user is speaking into the microphone) and provides a maximum attenuation of approximately 9.8 dB.

The un-attenuated Left Channel Signal 300/320 passes onto the Receive Signal Combiner, 3B, along with the un-attenuated Right Channel Signal 301/321. The Receive Signal Combiner, 3B, is a resistive network mixing the Left Channel with the Right Channel using resistors R13 and R17. (See FIG. 4.) The combined signal. 330, exits the Signal Combiner, 3B, and travels to the Signal Filter Amplifier, 3C.

Figure 14:
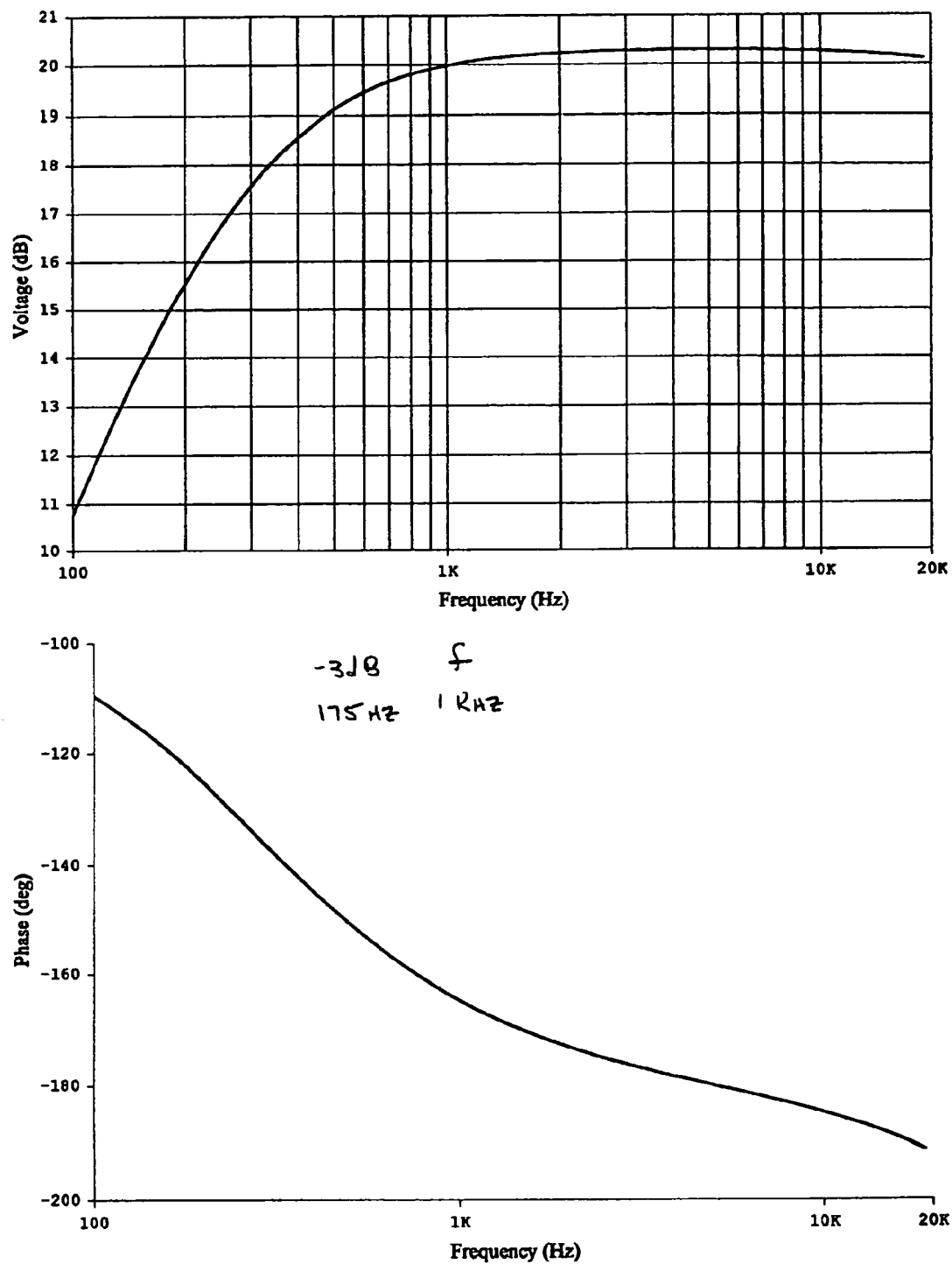
FIG. 14 shows the Signal Filter Amplifier response curve.

The Signal Filter amplifier, 3C, has a preferred high-pass filter response of approximately 1 kilohertz with a fairly steep low-pass cutoff of −3 dB at 175 hertz as can be seen in FIG. 14, although the values may vary by plus/minus 20 percent. The AC signal gain is approximately 20 dB. The filtered signal continues on as signal 340 entering the ABS (Absolute Value) circuit, 3D. The ABS circuit can be recognized as a ladder-type single stage absolute-value circuit described by H. A. Wittlinger in the RCA CA3140 data sheet ("Applications"). The gain of the ABS circuit is 0.5, thus a 2 Volt peak-to-peak signal would produce an absolute value of 1 Volt. The rectified DC signal, 350, drives the Integrator Amplifier, 3E.

The Integrator Amplifier, 3E, has an RC charge time constant of approximately 4.7 milliseconds and a RC discharge time constant of approximately 75 milliseconds, although the values may vary by plus/minus 20 percent. The amplifier portion of the Integrator Amplifier, 3E, has a DC signal gain of approximately 20 dB. The varying DC signal produced by the Integrator Amplifier forms signal 360, the microphone attenuator control signal, MIC-ATT, that controls the Microphone Attenuator, 1E, of the Transmit Section (FIG. 1), as previously described. Essentially, whenever there is audio in the speaker, the microphone audio output signal is attenuated.

Signal 330 applied to the Signal Filter Amplifier, 3C, the ABS Circuit, 3D, the Integrator Amplifier, 3E, essentially form the echo logic circuit that controls attenuation of the microphone in the transmit section of the device.

As previously explained, whenever there is audio in the microphone, the speakers are attenuated, and whenever there is audio in the speaker, the microphone audio output signal is attenuated. There is, however, interaction between speaker attenuation, microphone attenuation and microphone muting, but the combined analog delays found in the filter responses and within the three sections forming the overall invention act together to cancel echo.

Figure 5:
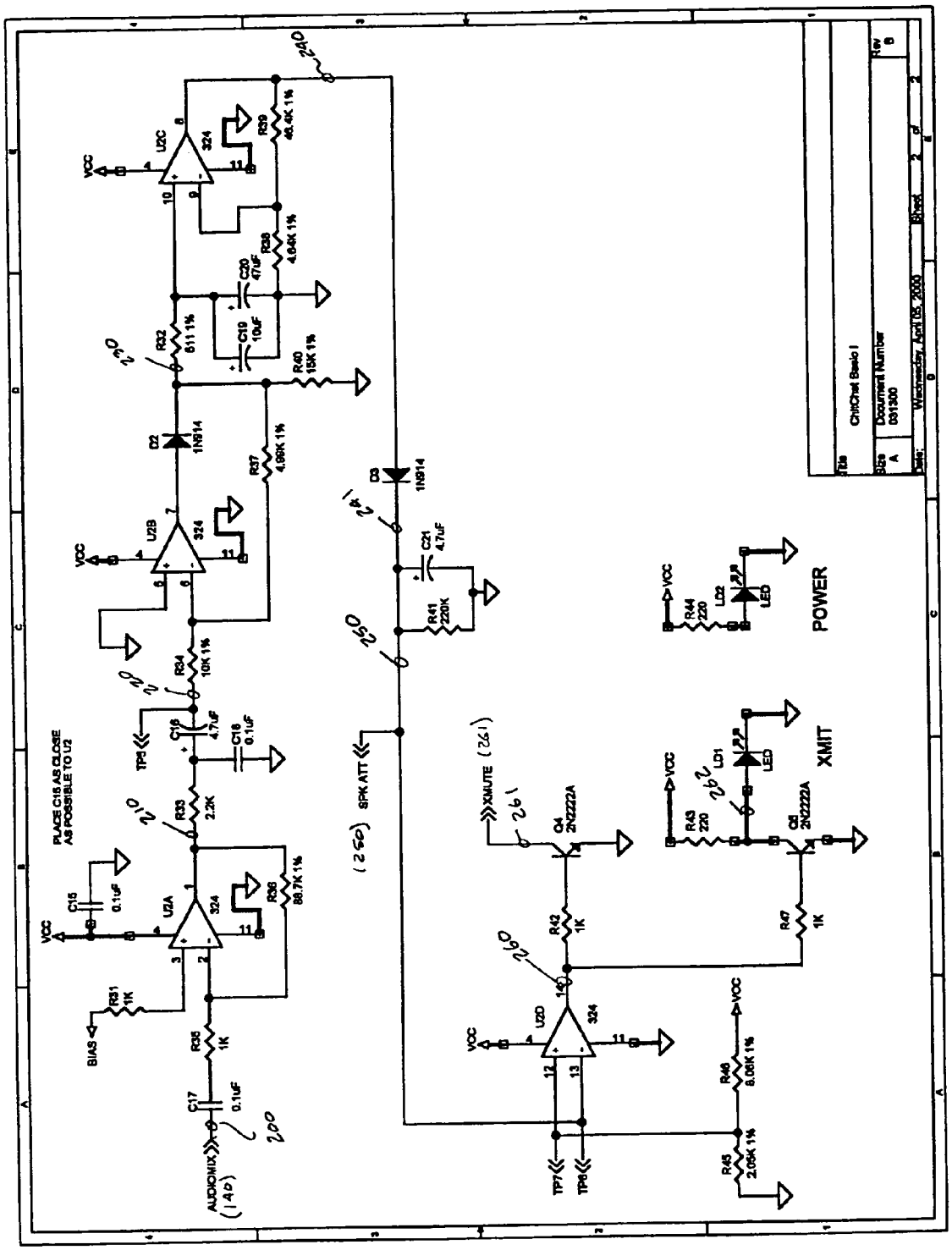
FIG. 5 is page two of the general device schematic diagram.

FIGS. 4 and 5 show the overall device schematic diagram and the signals referenced in the above description are shown in these schematics. The average person skilled in the art should be able to take these schematics, which are the actual schematics used in the working prototype device and duplicate the device, providing reference is made to the circuit description given above.

The power supply, not described in detail, is shown in these schematics, and any person skilled in the art may readily duplicate the power supply portion of the preferred device. The power supply takes DC power (9 VDC) supplied by a commercially available mains to dc unit, regulates the supplied DC, and supplies the required power to components within the device.

The device is packaged in a small enclosure with standard jack connections for interface with soundcards found on personal computer systems (or the like). In some circumstances power may be taken from the computer system; otherwise, power may be supplied from the AC line (AC Mains) using standard techniques described above. Other forms of jacks, connections and/or enclosures may be used to interface the device to other systems. In fact the device may be built-in to systems which require the characteristics exhibited and described in this disclosure. The discrete component circuit of the preferred device, may easily be implemented in an large scale integrated circuit or in a hybrid form. This is a manufacturing choice.

There is disclosed the best and preferred mode for practicing the art described in this disclosure. It should be realized that a person skilled in the art may change the individual filter response curves to obtain the same general overall response curves. As stated in the disclosure it is the overall response curves that cause the instant invention to operate in the manner described. Therefore, any such changes would be contemplated by the inventor and fall within the claims and the scope of the disclosure.

I claim:

1. An echo/noise canceling device for suppressing echoes and background noise during Internet telephony using a personal computer (PC) coupled to the Internet, comprising:

left and right loudspeaker inputs means for accepting left and right loudspeaker signals emanating from said PC;

left and right loudspeaker output means;

signal combining means coupled to said loudspeaker input means for providing combined left and right loudspeaker signal;

echo logic circuit means coupled to said signal combining means for generating a microphone attenuator control signal responsive to said loudspeaker signals;

left and right channel attenuator means responsive to a speaker attenuation control signal coupled to said speaker input means and providing attenuated left and right loudspeaker signals coupled to respective left and right loudspeaker output means;

microphone input signal means;

microphone output means for providing an audio signal to said PC;

means for providing an audio-mix signal derived from said microphone input signal and coupled to said microphone input means;

microphone attenuation circuit means responsive to said microphone attenuator control signal coupled to said audio-mix signal;

mute control means responsive to a microphone mute control signal coupled to said audio-mix signal and to said microphone output means;

a mute control amplifier coupled to said audio-mix signal having a gain of approximately 39 dB and a band-pass response centered about approximately 4.2 kilohertz with 3 dB cutoff points at approximately 723 hertz and 12.5 kilohertz coupled to a Mute Control Filter having a second order low-pass filter response of approximately 723 hertz with a 3 dB cutoff point at approximately 1.25 kilohertz driving an absolute valve circuit with a gain of approximately 0.5 providing a DC signal driving an integrator amplifier having an RC time charging constant of approximately 29 milliseconds and a discharge time constant of approximately 941 milliseconds and DC gain of approximately 21 dB further driving an R/C Control circuit thus generating said speaker attenuation control signal; and a voltage comparator circuit coupled to said speaker attenuation signal with a trip point of approximately 1.0 volts for generating said microphone mute control signal.

2. An echo/noise canceling device for suppressing echoes and background noise during Internet telephony using a personal computer (PC) coupled to the Internet, comprising:

left and right loudspeaker inputs means for accepting left and right loudspeaker signals emanating from said PC;

left and right loudspeaker output means;

two summation resistors coupled to said loudspeaker input means for providing combined left and right loudspeaker signal;

echo logic circuit means coupled to said signal combining means for generating a microphone attenuator control signal responsive to said loudspeaker signals;

left and right channel attenuators each comprising a voltage division network formed by a plurality of resistors and the emitter to collector resistance of a bi-polar transistor wherein said emitter to collector resistance is controlled by the bi-polar base bias current responsive to a speaker attenuation control signal coupled to said speaker input means for providing attenuated left and right loudspeaker signals coupled to respective left and right loudspeaker output means;

microphone input signal means;

microphone output means for providing an audio signal to said PC;

means for providing an audio-mix signal derived from said microphone input signal and coupled to said microphone input means;

microphone attenuation circuit means responsive to said microphone attenuator control signal coupled to said audio-mix signal;

mute control means responsive to a microphone mute control signal coupled to said audio-mix signal and to said microphone output means;

means for generating said speaker attenuation control signal derived from said audio-mix signal; and means for generating said microphone mute control signal derived from said speaker attenuation signal.

3. The apparatus of claim 2 wherein said echo logic circuit means comprises a signal filter amplifier having a high-pass filter response of ranging between 980 and 1020 hertz with a low-pass cutoff ranging between 140 and 210 hertz and gain of ranging between 16 and 24 dB driving an absolute valve circuit with a gain of 0.5 providing a DC signal driving an integrator amplifier having an RC time charging constant ranging between 3.6 and 5.6 milliseconds and a discharge time constant ranging between 50 and 90 milliseconds and DC gain ranging between 16 and 24 dB thus generating said microphone attenuator control signal.

4. The apparatus of claim 2 wherein said echo logic circuit means comprises a signal filter amplifier having a high-pass filter response of approximately 1 kilohertz with a low-pass cutoff at approximately 175 hertz and gain of approximately 20 dB driving an absolute valve circuit with a gain of approximately 0.5 providing a DC signal driving an integrator amplifier having an RC time charging constant of approximately 4.7 milliseconds and a discharge time constant of approximately 75 milliseconds and DC gain of approximately 20 dB thus generating said microphone attenuator control signal.

5. An echo/noise canceling device for suppressing echoes and background noise during Internet telephony using a personal computer (PC) coupled to the Internet, comprising:

left and right loudspeaker inputs means for accepting left and right loudspeaker signals emanating from said PC;

left and right loudspeaker output means;

signal combining means coupled to said loudspeaker input means for providing combined left and right loudspeaker signal;

echo logic circuit means coupled to said signal combining means for generating a microphone attenuator control signal responsive to said loudspeaker signals;

left and right channel attenuator means responsive to a speaker attenuation control signal coupled to said speaker input means and providing attenuated left and right loudspeaker signals coupled to respective left and right loudspeaker output means;

microphone input signal means;

microphone output means for providing an audio signal to said PC;

a Pre-Filter coupled to said microphone input having a band pass response with center frequency of approximately 2.3 kilohertz and 3 dB cutoff points at approximately 287 hertz and 19.28 kilohertz the output thereof coupled to a Microphone Amplifier having a gain of approximately 32.6 dB driving a band pass filter having a center frequency of approximately 638 hertz with 3 dB cutoff points at approximately 281 hertz and 1.5 kilohertz coupled to a resistive isolator thereby providing an audio-mix signal derived from said microphone input signal and coupled to said microphone input means;

a voltage divider network formed by a plurality of resistors and the emitter to collector resistance of a bi-polar transistor wherein said emitter to collector resistance is controlled by the bi-polar base bias current provided by said microphone attenuation control signal coupled to said audio-mix signal;

a microphone mute control signal capacitively coupled to said audio-mix signal and capacitively coupled to said microphone output means;

means for generating said speaker attenuation control signal derived from said audio-mix signal; and means for generating said microphone mute control signal derived from said speaker attenuation signal.

6. An echo/noise canceling device for suppressing echoes and background noise during Internet telephony using a personal computer (PC) coupled to the Internet, comprising:

left and right loudspeaker inputs means for accepting left and right loudspeaker signals emanating from said PC;

left and right loudspeaker output means;

signal combining means coupled to said loudspeaker input means for providing combined left and right loudspeaker signal;

echo logic circuit means coupled to said signal combining means for generating a microphone attenuator control signal responsive to said loudspeaker signals;

left and right channel attenuator means responsive to a speaker attenuation control signal coupled to said speaker input means and providing attenuated left and right loudspeaker signals coupled to respective left and right loudspeaker output means;

microphone input signal means;

microphone output means for providing an audio signal to said PC;

an audio-mix signal provided by a Pre-Filter coupled to said microphone input having a band pass response with center frequency ranging between 1.8 and 2.8 kilohertz and 3 dB cutoff points ranging between 230 and 334 hertz and ranging between and 15.41 and 23.15 kilohertz the output thereof coupled to a Microphone Amplifier having a gain ranging between 26.1 and 39.1 dB driving a band pass filter having a center frequency ranging between 511 and 765 hertz with 3 dB cutoff points ranging between 225 and 337 hertz and ranging between 1.2 and 1.8 kilohertz coupled to a resistor isolator thereby providing said audio-mix signal derived from said microphone input signal and coupled to said microphone input means;

microphone attenuation circuit means responsive to said microphone attenuator control signal coupled to said audio-mix signal;

mute control means responsive to a microphone mute control signal coupled to said audio-mix signal and to said microphone output means;

means for generating said speaker attenuation control signal derived from said audio-mix signal; and means for generating said microphone mute control signal derived from said speaker attenuation signal.

7. The apparatus of claim 6 wherein said microphone attenuator means comprises a voltage divider network formed by a plurality of resistors and the emitter to collector resistance of a bi-polar transistor wherein said emitter to collector resistance is controlled by the bi-polar base bias current provided by said microphone attenuation control signal.

8. The apparatus of claim 7 wherein said mute control means responsive to said microphone mute control signal comprises a capacitor coupling said audio-mix signal to said microphone mute control signal and further capacitor coupling to said microphone means.

9. An echo/noise canceling device for suppressing echoes and background noise during Internet telephony using a personal computer (PC) coupled to the Internet, comprising:

left and right loudspeaker inputs means for accepting left and right loudspeaker signals emanating from said PC;

left and right loudspeaker output means;

signal combining means coupled to said loudspeaker input means for providing combined left and right loudspeaker signal;

echo logic circuit means coupled to said signal combining means for generating a microphone attenuator control signal responsive to said loudspeaker signals;

left and right channel attenuator means responsive to a speaker attenuation control signal coupled to said speaker input means and providing attenuated left and right loudspeaker signals coupled to respective left and right loudspeaker output means;

microphone input signal means;

microphone output means for providing an audio signal to said PC;

means for providing an audio-mix signal derived from said microphone input signal and coupled to said microphone input means;

microphone attenuation circuit means responsive to said microphone attenuator control signal coupled to said audio-mix signal;

mute control means responsive to a microphone mute control signal coupled to said audio-mix signal and to said microphone output means;

a mute control amplifier coupled to said audio-mix signal having a gain ranging between 31.2 and 46.8 dB and a band-pass response centered about a range of 5.0 to 3.4 kilohertz with 3 dB cutoff points ranging between 580 and 867 hertz and ranging between 10.0 and 15.0 kilohertz coupled a Mute Control Filter having a second order low-pass filter response ranging between 580 and 867 hertz with a 3 dB cutoff point ranging between 1.0 and 1.5 kilohertz driving an absolute valve circuit with a gain of 0.5 providing a DC signal driving an integrator amplifier having an RC time charging constant ranging between 23.2 and 34.8 milliseconds and a discharge time constant ranging between 753 and 1129 milliseconds and DC gain ranging between 17 and 25 dB further driving an R/C Control circuit thus generating said speaker attenuation control signal; and means for generating said microphone mute control signal derived from said speaker attenuation signal.

10. The apparatus of claim 9 wherein said means for generating said microphone mute control signal comprises a voltage comparator circuit with a trip point of approximately 1.0 volts thus generating said microphone mute control signal.

11. An echo/noise canceling device for suppressing echoes and background noise during Internet telephony using a personal computer (PC) coupled to the Internet, comprising:

left and right loudspeaker inputs means for accepting left and right loudspeaker signals emanating from said PC;

left and right loudspeaker output means;

signal combining means coupled to said loudspeaker input means for providing combined left and right loudspeaker signal;

echo logic circuit means coupled to said signal combining means for generating a microphone attenuator control signal responsive to said loudspeaker signals;

left and right channel attenuators each comprising a voltage division network formed by a plurality of resistors and the emitter to collector resistance of a bi-polar transistor wherein said emitter to collector resistance is controlled by the bi-polar base bias current responsive to a speaker attenuation control signal coupled to said speaker input means for providing attenuated left and right loudspeaker signals coupled to respective left and right loudspeaker output means;

microphone input signal means;

microphone output means for providing an audio signal to said PC;

an audio-mix signal provided by a Pre-Filter coupled to said microphone input having a band pass response with center frequency ranging between 1.8 and 2.8 kilohertz and 3 dB cutoff points ranging between 230 and 344 hertz and ranging between and 15.41 and 23.15 kilohertz the output thereof coupled to a Microphone Amplifier having a gain ranging between 26.1 and 39.1 dB driving a band pass filter having a center frequency ranging between 511 and 765 hertz with 3 dB cutoff points ranging between 225 and 337 hertz and ranging between 1.2 and 1.8 kilohertz coupled to a resistive isolator thereby providing said audio-mix signal derived from said microphone input signal and coupled to said microphone input means;

microphone attenuation circuit means responsive to said microphone attenuator control signal coupled to said audio-mix signal;

mute control means responsive to a microphone mute control signal coupled to said audio-mix signal and to said microphone output means;

a mute control amplifier coupled to said audio-mix signal having a gain ranging between 31.2 and 46.8 dB and a band-pass response centered about a range of 5.0 to 3.4 kilohertz with 3 dB cutoff points ranging between 580 and 867 hertz and ranging between 10.0 and 15.0 kilohertz coupled a Mute Control Filter having a second order low-pass filter response ranging between 580 and 867 hertz with a 3 dB cutoff point ranging between 1.0 and 1.5 kilohertz driving an absolute valve circuit with a gain of 0.5 providing a DC signal driving an integrator amplifier having an RC time charging constant ranging between 23.2 and 34.8 milliseconds and a discharge time constant ranging between 753 and 1129 milliseconds and DC gain ranging between 17 and 25 dB further driving an R/C Control circuit thus generating said speaker attenuation control signal; and means for generating said microphone mute control signal derived from said speaker attenuation signal.

* * * * *